May 28, 1968     A. K. H. BRAUN     3,385,117
SINGLE DRIVING DEVICE OF A PLURALITY OF KITCHEN APPLIANCES
Filed March 21, 1966     2 Sheets-Sheet 1

Inventor
Artur K. H. Braun

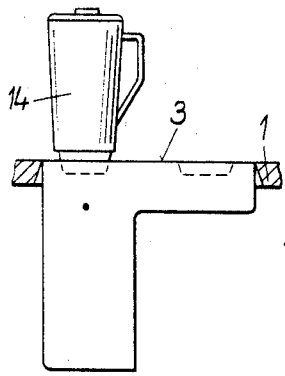
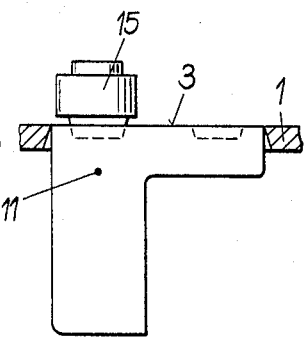
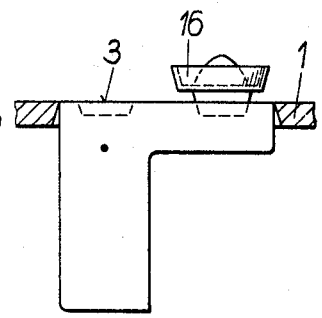
Fig. 3              Fig. 4              Fig. 5
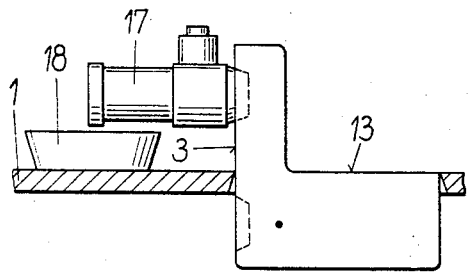
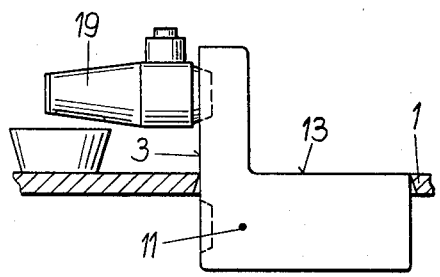
Fig. 6              Fig. 7
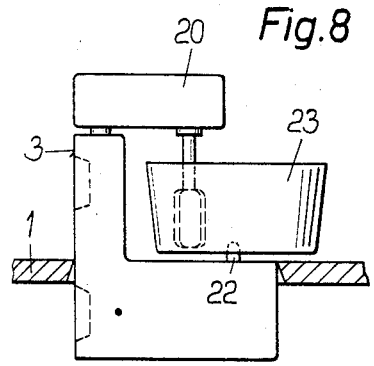
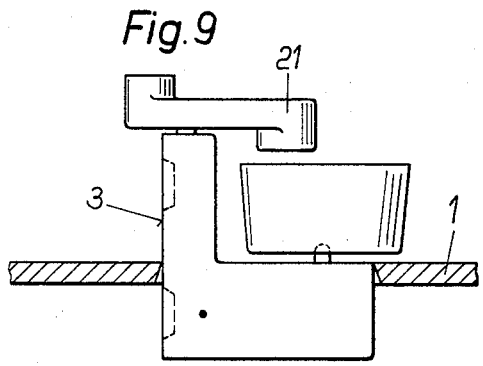
Fig. 8              Fig. 9

United States Patent Office 3,385,117
Patented May 28, 1968

3,385,117
SINGLE DRIVING DEVICE OF A PLURALITY
OF KITCHEN APPLIANCES
Artur K. H. Braun, Koenigstein, Taunus, Germany,
assignor to Braun Aktiengesellschaft, Frankfurt,
Germany
Filed Mar. 21, 1966, Ser. No. 535,978
10 Claims. (Cl. 74—16)

ABSTRACT OF THE DISCLOSURE

An appliance driving device, for a table-top having an opening, comprising a housing having a plurality of operating positions, means to rotate said housing about at least one axis parallel to the table top to bring said housing selectively into its operating positions; housing walls having parts formed to fit into and seal said opening in each of said operating positions; parts of said walls formed to provide working surfaces to supplement said table-top and to accommodate appliance accessories; at least one motor rigidly mounted within said housing; a motor drive shaft; a plurality of appliance connecting shafts mounted spaced in said walls perpendicularly to their respective said walls for use in said operating positions, parts of said walls formed to provide appliance connecting shaft mounts at various elevations above the table top; shaft drive means to drive said appliance connecting shafts by said motor drive shaft; and at least one connecting shaft driven appliance for mating with said connecting shafts one at the time.

FIELD OF THE INVENTION

The invention relates to an electromotive appliance driving device for kitchen appliances.

SUMMARY OF THE INVENTION

The objects of the present invention are: to provide an appliance driving device to drive various appliances as attachments connected to rotating shafts at a variety of positions favorable to their use; to provide an appliance driving device together with a plurality of different appliance attachments, coordinated for a common useful purpose, such as for various kitchen operations; to provide an appliance driving device that allows easy positioning of rotating shafts to accommodate appliances at positions favorable to their use; to provide an appliance driving device that places working surfaces with ease in positions favorable to effective use of appliances connected on the device; to provide an easy assembly of the appliance drive with the attachment selected for a particular operation; to provide a compact, space-saving appliance driving device.

BRIEF DESCRIPTION OF THE DRAWINGS

Other objects and many advantages of the invention will become apparent to those skilled in the art, after a study of the following detailed description in connection with the accompanying drawings, wherein:

FIGS. 3–5 illustrate three different embodiments of the first operating position; and FIGS. 6–9 show four embodiments of the second operating position of the drive.

In FIG. 1, a table-top 1 is shown having an opening 2 closed off by a housing wall 3 of the device A. The drive of the device comprises a drive motor 4, with a motor drive shaft 5 extending into a first appliance connecting shaft 6 and a second and a third connecting shafts 7 and 8 respectively being connected thereto by a speed reduction gearing having in this embodiment two worm gears 9 and 9'. The connecting shaft 6 has no reduction gear, and serves directly as a high-speed drive, for example from about 5,000 to about 20,000 r.p.m., while the connecting shaft 8, which has a high reduction gearing, serves as a low-speed drive, for example from about 50 to 150 r.p.m. The connecting shaft 7 has an intermediate rotational speed, for example from about 500 to about 2,000 r.p.m.

Figure 1:
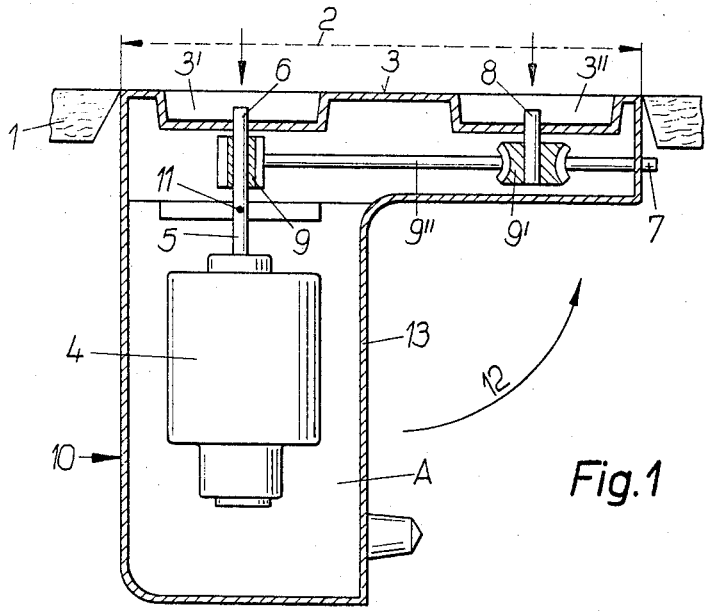
FIG. 1 shows the device in a first operating position with a vertically-directed motor drive shaft.

The main drive shaft 9″ of the speed reduction gearing and the motor drive shaft 5 are positioned at right angles to each other through the use of rotational direction changing worm gear 9. Because of this arrangement, the housing 10 has a cross-sectional pistol-type shape. The housing is mounted pivotably about a horizontal axis 11 extending at right angles to the plane of the drawing. As soon as it arrives in the position shown in FIG. 1, it is locked by a locking device such as a spring biased bolt, not shown.

Figure 2:
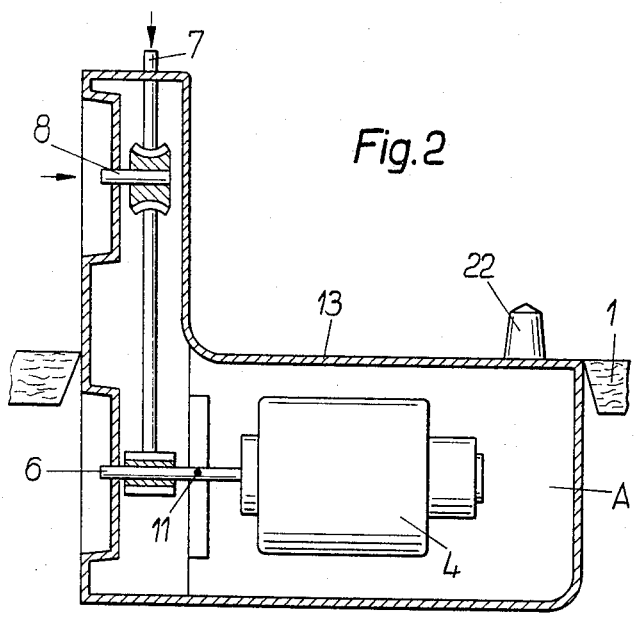
FIG. 2 shows the device in a second operating position with a horizontally-directed motor drive shaft.

When pivoting the housing from the position of FIG. 1 about the axis 11 in the direction of arrow 12, the device A arrives at its second operating position shown in FIG. 2, in which the housing is again locked. The walls of the housing 10 are dimensioned such that the opening 2 in the table is again sealed in the second operating position shown in FIG. 2. Surface 13 is included in these walls.

FIG. 2 shows that the motor 4 remains beneath the table-top 1. Also in the second operating position this arrangement has the advantage that no space is taken up by the motor on the working surface, and that only the light and spatially small gearing and connecting shaft assembly appears above the working surface.

Pivoting of the device places the various connecting shafts at different heights above the working surface and also varies their direction. Thus, appliances can be connected at a number of different locations.

In particular the low-speed pivot shaft 8 of this embodiment is accessible in either operating position: It can be used in a vertical position and at approximately the height of the table-top 1 as shown in FIG. 1, or in a horizontal position above the table-top as shown in FIG. 2. The high-speed secondary drive 6 and the intermediate secondary drive 7 can be used alternately. Both are used in vertical positions. During use, the pivot shaft 6 of the high-speed secondary drive is approximately at the height of the working surface, as is shown in FIG. 1, while the pivot shaft 7 of the intermediate secondary drive is positioned at a substantially greater height when in use, as shown in FIG. 2.

Recesses 3′ and 3″, provided in the housing wall 3 forming the top surface in the operating position of FIG. 1 are concentric to the connecting shafts 6 and 8 and serve for easy centering of appliances attached to the device as shown in FIGS. 3 to 7.

Because of the higher positioning of the connecting shafts 7 and 8 in the second operating position according to FIG. 2, bowls and the like can be placed beneath appliances connected to these shafts, as shown in FIGS. 6 to 9.

FIGS. 3, 4 and 5 show the drive in the first operating position when used with appliances which do not require elevated positions. In FIG. 3, 14 designates a mixing device placed on the high-speed shaft. In FIG. 4, a coffee mill 15 is placed on the high-speed shaft. FIG. 5 illustrates a squeezing device for citrus fruit placed on the low-speed secondary drive.

In the second operating position, a meat grinder 17 is attached in FIG. 6 to the low-speed connecting shaft, and FIG. 7 shows a juice-producing device 19 attached to this low-speed drive. A bowl 18 is placed beneath this appliance.

FIGS. 8 and 9 show two ways of using the intermediate speed connecting shaft. In FIG. 8, a stirrer 20 is connected and surface 13 is positioned to support bowl 23.

A rotatable bearing, for example in the form of a pivot pin 22, or a bore in the surface 13, is provided for the bowl. Shredding device 21 is connected in FIG. 9.

Thus, in summary, the device of the present invention mounted in a conventional manner in a cutout in and below a surface provides drive for varying purposes of use. It is pivotable about an axis parallel to the surface, it protrudes to various heights above this working surface. The housing containing the motor and the gearing is fashioned in such a manner that the opening in the surface is sealed in every one of the operating positions of the housing. In one position the housing is flush with the working surface; in other operating positions, it is more or less projecting therefrom, and the change of positions is possible at any time, in an always reproducible manner, without the expenditure of energy, and without special gearing means.

The inventive construction of the device permits the arrangement of the drive behind an opening in a surface in such a manner that this opening is closed off in each one of the operating positions and in such a manner that appliance connecting shafts assume varying heights above the working surface.

Advantageously, an arrangement of motor and gearing system is chosen so that the motor, in the various operating positions, remains at least partially below, or behind, the surface, and the operating height necessary for connection of the appliances is obtained only by the housing with portions of the drive gear.

The invention is not limited to the embodiment presented here. It is, for example, within the scope of the invention to fashion at least several of the various connecting shafts in duplicate. Thus, at least two high-speed connecting shafts can be provided in parallel to drive, f.i., a mixing bowl 14 according to FIG. 3 and a coffee mill 15 according to FIG. 4 simultaneously beside each other. This can be accomplished by providing an additional gearing. This type of modification holds true for the other connecting shafts also.

If the mounting surface of the device is not a table top but rather a vertical wall, for example the wall of a kitchen closet, another possible modification is to make the device pivotable about a vertical axis. The individual connecting shaft speeds must then be distributed in correspondence with the appliances, particularly kitchen appliances, which are to be employed.

Furthermore, the device of the present invention is not limited to use in connection with kitchen appliances, but can also be used advantageously for other purposes, for example in connection with machine tools.

It should be understood, of course, that the foregoing disclosure relates to only preferred embodiments of the invention and that it is intended to cover all changes and modifications of the examples of the invention therein chosen for the purposes of the disclosure, which do not constitute departures from the spirit and scope of the invention set forth in the appended claims.

The invention claimed is:
1. An appliance driving device, for a table-top having an opening, comprising a housing having a plurality of operating positions; means to rotate said housing about at least one axis parallel to the table top to bring said housing selectively into its operating positions; housing walls having parts formed to fit into and seal said opening in each of said operating positions; parts of said walls formed to provide working surfaces to supplement said table-top and to accommodate appliance accessories; at least one motor rigidly mounted within said housing; a motor drive shaft; a plurality of appliance connecting shafts mounted spaced in said walls perpendicularly to their respective said walls for use in said operating positions; parts of said walls formed to provide appliance connecting shaft mounts at various elevations above the table top; shaft drive means to drive said appliance connecting shafts by said motor drive shaft; and at least one connecting shaft driven appliance for mating with said connecting shafts one at a time.

2. An appliance driving device, as claimed in claim 1, said shaft drive means comprising speed changing means to make the speed of at least one of said appliance connecting shafts different from the speed of said motor drive shaft.

3. An appliance driving device as claimed in claim 1, said shaft drive means comprising rotational direction changing means to make the rotational direction of at least one of said appliance connecting shafts different from the rotational direction of said motor drive shaft.

4. An appliance driving device as claimed in claim 1, the motor remaining below the table top with at least a longitudinal part thereof, in all operating positions of said housing; at least some of the walls provided with circular recesses countersunk below and relative to the plane of the respective wall; each of said recesses having a centered orifice for its respective appliance connecting shaft; said connecting shaft protruding therethrough and ending below the working surface of the wall for mating assembly with an appliance having a corresponding projecting connection for rotational drive thereof.

5. An appliance driving device as claimed in claim 4, said countersunk circular recesses being conically tapered for easier assembly with the appliance.

6. An appliance driving device as claimed in claim 2, said speed changing means providing at least one low speed appliance connecting shaft with a rotational speed less than that of said low speed appliance connecting shaft extending vertically within the table top in one of said operating positions and extending horizontally above a wall-formed working surface in another of said operating positions.

7. An appliance driving device as claimed in claim 2, said speed changing means providing at least one high speed appliance connecting shaft; said high-speed appliance connecting shaft accessible in only one of said operating positions and positioned approximately at the height of a working surface perpendicularly thereto.

8. An appliance driving device as claimed in claim 2, said speed changing means providing at least one intermediate-speed appliance connecting shaft accessible in only one operating position and extending at right angles to a working surface substantially above it.

9. An appliance driving device as claimed in claim 1, including at least one appliance connecting shaft extending horizontally and substantially above the wall of the housing which represents the working surface.

10. An appliance driving device as claimed in claim 1, including at least one connecting shaft having its operating end substantially flush with a working surface.

References Cited
UNITED STATES PATENTS 2,801,545   8/1957   Schöttle _____ 74—16
3,222,939   12/1965  Staeger _____ 74—16

FRED C. MATTERN, Jr., *Primary Examiner.*
MILTON KAUFMAN, *Examiner.*
F. D. SHOEMAKER, *Assistant Examiner.*